(12) United States Patent
Arlt et al.

(10) Patent No.: US 7,435,318 B2
(45) Date of Patent: *Oct. 14, 2008

(54) IONIC LIQUIDS AS SELECTIVE ADDITIVES FOR SEPARATION OF CLOSE-BOILING OR AZEOTROPIC MIXTURES

(75) Inventors: Wolfgang Arlt, Hohen Neuendorf (DE); Matthias Seiler, Berlin (DE); Carsten Jork, Berlin (DE); Thomas Schneider, Berlin (DE)

(73) Assignee: BASF Aktiengesellschaft, Ludwigshaffen (DE)

( * ) Notice: Subject to any disclaimer, the term of this patent is extended or adjusted under 35 U.S.C. 154(b) by 870 days.

This patent is subject to a terminal disclaimer.

(21) Appl. No.: 10/471,546

(22) PCT Filed: Mar. 14, 2002

(86) PCT No.: PCT/EP02/02824

§ 371 (c)(1),
(2), (4) Date: Sep. 11, 2003

(87) PCT Pub. No.: WO02/074718

PCT Pub. Date: Sep. 26, 2002

(65) Prior Publication Data

US 2004/0133058 A1 Jul. 8, 2004

(30) Foreign Application Priority Data

Mar. 20, 2001 (DE) .................. 101 14 734
Jul. 17, 2001 (DE) .................. 101 36 614

(51) Int. Cl.
*B01D 3/40* (2006.01)
*C07C 7/08* (2006.01)

(52) U.S. Cl. ................. 203/14; 203/3; 203/15; 203/17; 203/18; 203/49; 203/57; 585/833; 585/864; 585/866

(58) Field of Classification Search ............ 203/3, 203/14, 15, 17, 18, 49, 33, 60, 57; 585/833, 585/864, 866, 868
See application file for complete search history.

(56) References Cited

U.S. PATENT DOCUMENTS

| 3,304,341 A | 2/1967 | Berthold et al. |
| 6,339,182 B1 * | 1/2002 | Munson et al. ............. 585/809 |
| 7,304,200 B2 * | 12/2007 | Roettger et al. ............ 585/833 |
| 2007/0080052 A1 * | 4/2007 | Beste et al. ................. 203/50 |

FOREIGN PATENT DOCUMENTS

| GB | 1 011886 | 8/1965 |
| WO | 01/98239 | 12/2001 |
| WO | 03/040264 | * 5/2003 |

* cited by examiner

*Primary Examiner*—Virginia Manoharan
(74) *Attorney, Agent, or Firm*—Novak Druce + Quigg LLP (57) ABSTRACT

The invention relates to a process for separating close-boiling, homo- and heteroazeotropic mixtures by using ionic liquids. Due to the selectivity and unusual combination of properties of the ionic liquids the process is superior to conventional extractive rectification from the point of view of costs and energy.

30 Claims, 1 Drawing Sheet

Figure 1: Embodiment of the extractive rectification system

IONIC LIQUIDS AS SELECTIVE ADDITIVES FOR SEPARATION OF CLOSE-BOILING OR AZEOTROPIC MIXTURES

The invention relates to a process and a method for separating close-boiling or azeotropic mixtures by using ionic liquids as selective additives in rectification.

Numerous liquid mixtures occur in industry which cannot be separated by conventional rectification but rather are preferably separated by extractive rectification [Stichlmair, S. and Fair, J., Distillation, ISBN 0-471-25241-7, page 241 et seq.]. This state of affairs is due to the similar boiling behavior of the components of the mixture, that is to say their property of distributing themselves between the vapor and liquid phase in almost or exactly equimolar proportions at a defined pressure and a defined temperature.

The effort of separating a binary liquid mixture composed of the components i and j by rectification is reflected in what is known as the separation factor $\alpha_{ij}$, the distribution coefficient of components i and j. The closer the separation factor approaches the value one the more effort the separation of the components of the mixture by conventional rectification requires, since either the number of theoretical plates in the distillation column and/or the reflux ratio at the top of the column must be increased. If the separation factor assumes the value one an azeotropic point is reached and further enrichment of the components of the mixture is no longer possible, even if the number of theoretical plates or the reflux ratio is increased. In general when making use of the separation factor it has to be borne in mind that it can be greater than or less than 1 depending on whether the distribution coefficient of the low boiler is in the numerator or in the denominator. Normally the low boiler is placed in the numerator so that the separation factor is great than 1.

A procedure frequently employed in industry for separating close-boiling systems—by which is meant a separation factor less than 1.2 for instance—or azeotropic systems involves adding a selective additive, commonly referred to as the entrainer, to an extractive rectification. A suitable additive influences the separation factor by selective interaction with one or more of the components of the mixture so that separation of the close-boiling or azeotropically boiling components of the mixture is made possible. In extractive rectification the components obtained at the top and bottom of the column due to the action of the entrainer are the target components for the column.

A measure of the intensity of the interactions of the entrainer with one or more of the components of the mixture is provided by what is known as selectivity. Selectivity is defined as the ratio of the limiting activity coefficient of component i to the limiting activity coefficient of component j, components i and j being present at an infinite degree of dilution in the entrainer [Schult, C. J. et. al.; Infinite-dilution activity coefficients for several solutes in hexadecane and in n-methyl-2-pyrrolidone (NMP): experimental measurements and UNIFAC predictions; Fluid Phase Equilibria 179 (2001) pp. 117-129]. As expounded by Schult et. al., a higher entrainer selectivity results in a higher relative volatility, a lower reflux ratio and hence in lower separating costs. As disclosed later on, the aim is to achieve as high a selectivity as possible, e.g. greater than 1.3, preferably greater than 2.0.

The surprising discovery of the suitability of some ionic liquids for the separation of azeotropic and/or close-boiling mixtures on the basis of the entrainer selectivity and of the separation factor is shown below. The activity coefficients playing a key role in entrainer selectivity at infinite dilution can be determined by a variety of methods, preferably by using gas-liquid chromatography (GLC or GLPC) [Schult, C. J. et. al.; Infinite-dilution activity coefficients for several solutes in hexadecane and in n-methyl-2-pyrrolidone (NMP): experimental measurements and UNIFAC predictions; Fluid Phase Equilibria 179 (2001) pp. 117-129] and equations (4) and (6) used in the latter publication by Schult et. al.

On grounds of costs, the aim is to minimize the amount of additive to be employed. The entrainer is advantageously present substantially in the liquid phase in the column. Large volumes might result in an enlargement of the column diameter but would always give rise to an increased pressure loss in the vapor phase in the column and hence also to a greater energy loss.

Accordingly, an increase in the quantity of entrainer results in increased capital and operating costs.

For a given column length and the same reflux ratio the higher separation factor yields a purer product or for a given column length and degree of purity of the overhead product the higher separation factor results in a lower reflux ratio and hence in energy savings. For a given degree of purity and a given reflux ratio an increase in the quantity of entrainer and a higher separation factor results in savings in capital costs due to shortening of the length of the column. By these means the design engineer has the power to minimize capital or running costs (energy costs) on the basis of circumstances specific to the site.

The invention relates to a process and a method in which a novel class of substances, ionic liquids, is employed for separating close-boiling or azeotropic liquid mixtures since these ionic liquids are surprisingly superior to the conventional additives. The superiority can be seen directly in the selectivity and separation factor. When a suitable ionic liquid is used the separation factor at the azeotropic point is further removed from the value of one than is the case when equivalent quantities of a conventional additive are used.

By ionic liquids is meant those defined by Wasserscheid and Keim in Angewandte Chemie 2000, 112, 3926-3945. The ionic liquids group of substances represents a new type of solvent. As set out in the above publication ionic liquids are salts of nonmolecular, ionic nature which melt at relatively low temperatures. They are already in the molten state at relatively low temperatures less than 200° C., preferably less than 150° C., particularly preferably less than 100° C. and at the same time are of relatively low viscosity. They are highly soluble in a large number of organic, inorganic and polymeric substances.

By comparison with ionic salts, ionic liquids are molten at substantially lower temperatures (below 200° C. as a rule) and often have a melting point below 0° C., in some cases down to −96° C., which is important for the industrial implementation of extractive rectification.

Moreover, ionic liquids are usually nonflammable, noncorrosive, of low viscosity and are exceptional by having an immeasurable vapor pressure.

Compounds designated according to the invention as ionic liquids are those which have at least one positive and at least one negative charge but are overall neutral in charge and have a melting point below 200° C., preferably below 100, particularly preferably below 50° C.

Ionic liquids can also exhibit a plurality of positive or negative charges, for example 1 to 5, preferably 1 to 4, particularly preferably 1 to 3, very particularly preferably 1 to 2, but in particular one negative and one positive charge each.

The charges may be found at various localized or delocalized regions inside a molecule, that is to say like betaine, or be distributed in each case over a separate anion and cation. Those ionic liquids are preferred which are built up out of at least one cation and at least one anion. As stated above, the cation and anion may be singly or multiply charged, preferably singly charged.

Of course mixtures of different ionic liquids are also conceivable.

Preferred cations are ammonium or phosphonium ions or those cations containing at least a five- to six-membered heterocycle possessing at least one phosphorus or nitrogen atom and optionally an oxygen or sulfur atom, particularly preferably those compounds containing at least one five- to six-membered heterocycle possessing one, two or three nitrogen atoms and a sulfur or an oxygen atom, very particularly preferably those having one or two nitrogen atoms.

Particularly preferred ionic liquids are those having a molecular weight of less than 1,000 g/mol, very particularly preferably less than 350 g/mol.

Furthermore those cations are preferred which are selected from compounds of the formulae (Ia) to (Iw):

(a)

(b)

(c)

(d)

(e)

-continued (f)

(g)

(h)

(i)

(j)

(k)

(l)

(m)

(n)

as well as oligopolymers or polymers containing these structures, where $R^1$, $R^2$, $R^3$, $R^4$, $R^5$, $R^6$ and $R^7$ independently of one another each stand for $C_1$-$C_{18}$ alkyl, $C_2$-$C_{18}$ alkyl optionally interrupted by one or more oxygen and/or sulfur atoms and/or one or more substituted or unsubstituted imino groups, $C_6$-$C_{12}$ aryl, $C_5$-$C_{12}$ cycloalkyl or a five- to six-membered heterocycle possessing oxygen, nitrogen and/or sulfur atoms, or two of them jointly form an unsaturated, saturated or aromatic ring optionally interrupted by one or more oxygen and/or sulfur atoms and/or one or more substituted or unsubstituted imino groups, wherein said residues can each be substituted by functional groups, aryl, alkyl, aryloxy, alkyloxy, halogen, hetero atoms and/or heterocycles.

$R^1$, $R^2$, $R^3$, $R^4$, $R^5$ and $R^6$ can additionally represent hydrogen.

Moreover, $R^7$ can stand for $C_1$-$C_{18}$ alkyloyl (alkylcarbonyl), $C_1$-$C_{18}$-alkyloxycarbonyl, $C_5$-$C_{12}$ cycloalkylcarbonyl or $C_6$-$C_{12}$ aryloyl (arylcarbonyl), wherein said residues can be substituted by functional groups, aryl, alkyl, aryloxy, alkyloxy, halogen, hetero atoms and/or heterocycles.

Therein $C_1$-$C_{18}$ alkyl optionally substituted by functional groups, aryl, alkyl, aryloxy, alkyloxy, halogen, hetero atoms and/or heterocycles stands by way of example for methyl, ethyl, propyl, isopropyl, n-butyl, sec-butyl, tert-butyl, pentyl, hexyl, heptyl, octyl, 2-ethylhexyl, 2,4,4-trimethylpentyl, decyl, dodecyl, tetradecyl, heptadecyl, octadecyl, 1,1-dimethylpropyl, 1,1-dimethylbutyl, 1,1,3,3-tetramethylbutyl, benzyl, 1-phenylethyl, 2-phenylethyl, α,α-dimethylbenzyl, benzhydryl, p-tolylmethyl, 1-(p-butylphenyl)ethyl, p-chlorobenzyl, 2,4-dichlorobenzyl, p-methoxybenzyl, m-ethoxybenzyl, 2-cyanoethyl, 2-cyanopropyl, 2-methoxycarbonylethyl, 2-ethoxycarbonylethyl, 2-butoxycarbonylpropyl, 1,2-di-(methoxycarbonyl)ethyl, 2-methoxyethyl, 2-ethoxyethyl, 2-butoxyethyl, diethoxymethyl, diethoxyethyl, 1,3-dioxolan-2-yl, 1,3-dioxan-2-yl, 2-methyl-1,3-dioxolan-2-yl, 4-methyl-1,3-dioxolan-2-yl, 2-isopropoxyethyl, 2-butoxypropyl, 2-octyloxyethyl, chloromethyl, 2-chloroethyl, trichloromethyl, trifluoromethyl, 1,1-dimethyl-2-chloroethyl, 2-methoxyisopropyl, 2-ethoxyethyl, butylthiomethyl, 2-dodecylthioethyl, 2-phenylthioethyl, 2,2,2-trifluoroethyl, 2-hydroxyethyl, 2-hydroxypropyl, 3-hydroxypropyl, 4-hydroxybutyl, 6-hydroxyhexyl, 2-aminoethyl, 2-aminopropyl, 3-aminopropyl, 4-aminobutyl, 6-aminohexyl, 2-methylaminoethyl, 2-methylaminopropyl, 3-methylaminopropyl, 4-methylaminobutyl, 6-methylaminohexyl, 2-dimethylaminoethyl, 2-dimethylaminopropyl, 3-dimethylaminopropyl, 4-dimethylaminobutyl, 6-dimethylaminohexyl, 2-hydroxy-2,2-dimethylethyl, 2-phenoxyethyl, 2-phenoxypropyl, 3-phenoxypropyl, 4-phenoxybutyl, 6-phenoxyhexyl, 2-methoxyethyl, 2-methoxypropyl, 3-methoxypropyl, 4-methoxybutyl, 6-methoxyhexyl, 2-ethoxyethyl, 2-ethoxypropyl, 3-ethoxypropyl, 4-ethoxybutyl or 6-ethoxyhexyl and, $C_2$-$C_{18}$ alkyl optionally interrupted by one or more oxygen and/or sulfur atoms and/or one or more substituted or unsubstituted imino groups stands by way of example for 5-hydroxy-3-oxapentyl, 8-hydroxy-3,6-dioxaoctyl, 11-hydroxy-3,6,9-trioxaundecyl, 7-hydroxy-4-oxa-heptyl, 11-hydroxy-4,8-dioxaundecyl, 15-hydroxy-4,8,12-trioxapentadecyl, 9-hydroxy-5-oxa-nonyl, 14-hydroxy-5,10-oxatetradecyl, 5-methoxy-3-oxapentyl, 8-methoxy-3,6-dioxaoctyl, 11-methoxy-3,6,9-trioxaundecyl, 7-methoxy-4-oxaheptyl, 11-methoxy-4,8-dioxaundecyl, 15-methoxy-4,8,12-trioxapentadecyl, 9-methoxy-5-oxanonyl, 14-methoxy-5,10-oxatetradecyl, 5-ethoxy-3-oxapentyl, 8-ethoxy-3,6-dioxaoctyl, 11-ethoxy-3,6,9-trioxaundecyl, 7-ethoxy-4-oxa-heptyl, 11-ethoxy-4,8-dioxaundecyl, 15-ethoxy-4,8,12-trioxapentadecyl, 9-ethoxy-5-oxa-nonyl or 14-ethoxy-5,10-oxatetradecyl.

If two radicals form a ring these radicals may jointly stand for 1,3-propylene, 1,4-butylene, 2-oxa-1,3-propylene, 1-oxa-1,3-propylene, 2-oxa-1,3-propylene, 1-oxa-1,3-propenylene, 1-aza-1,3-propenylene, 1-($C_1$-$C_4$ alkyl)-1-aza-1,3-propenylene, 1,4-buta-1,3-dienylene, 1-aza-1,4-buta-1,3-dienylene or 2-aza-1,4-buta-1,3-dienylene.

The number of oxygen and/or sulfur atoms and/or imino groups is not limited. In general there are no more than 5 in the radical, preferably no more than 4 and very particularly preferably no more than 3.

Furthermore, between two hetero atoms there is usually at least one carbon atom, preferably at least two.

Substituted and unsubstituted imino groups can be by way of example imino, methylimino, iso-propylimino, n-butylimino or tert-butylimino.

Furthermore, functional groups stands for carboxy, carboxamido, hydroxy, di-($C_1$-$C_4$ alkyl)-amino, $C_1$-$C_4$ alkyloxycarbonyl, cyano or $C_1$-$C_4$ alkyloxy, $C_6$-$C_{12}$ aryl optionally substituted by functional groups, aryl, alkyl, aryloxy, alkyloxy, halogen, hetero atoms and/or heterocycles stands by way-of example for phenyl, tolyl, xylyl, α-naphthyl, β-naphthyl, 4-diphenylyl, chlorophenyl, dichlorophenyl, trichlorophenyl, difluorophenyl, methylphenyl, dimethylphenyl, trimethylphenyl, ethylphenyl, diethylphenyl, iso-propylphenyl, tert-butylphenyl, dodecylphenyl, methoxyphenyl, dimethoxyphenyl, ethoxyphenyl, hexyloxyphenyl, methylnaphthyl, isopropylnaphthyl, chloronoaphthyl, ethoxynaphthyl, 2,6-dimethylphenyl, 2,4,6-trimethylphenyl, 2,6-dimethoxyphenyl, 2,6-dichlorophenyl, 4-bromophenyl, 2- or 4-nitrophenyl, 2,4- or 2,6-dinitrophenyl, 4-dimethylaminophenyl, 4-acetylphenyl, ethoxyethylphenyl or ethoxymethylphenyl, $C_5$-$C_{12}$ cycloalkyl optionally substituted by functional groups, aryl, alkyl, aryloxy, alkyloxy, halogen, hetero atoms and/or heterocycles stands by way of example for cyclopentyl, cyclohexyl, cyclooctyl, cyclododecyl, methylcyclopentyl, dimethylcyclopentyl, methylcyclohexyl, dimethylcyclohexyl, diethylcyclohexyl, butylcyclohexyl, methoxycyclohexyl, dimethoxycyclohexyl, diethoxycyclohexyl, butylthiocyclohexyl, chlorocyclohexyl, dichlorocyclohexyl, dichlorocyclopentyl as well as a saturated or unsaturated bicyclic system such as norbornyl or norbornenyl for example, a five- to six-membered heterocycle possessing oxygen, nitrogen and/or sulfur atoms stands by way of example for furyl, thiophenyl, pyrryl, pyridyl, indolyl, benzoxazolyl, dioxolyl, dioxyl, benzimidazolyl, benzthiazolyl, dimethylpyridyl, methylquinolyl, dimethylpyrryl, methoxyfuryl, dimethoxypyridyl, difluoropyridyl, methylthiophenyl, isopropylthiophenyl or tert-butylthiophenyl and $C_1$ to $C_4$ alkyl stands by way of example for methyl, ethyl, propyl, isopropyl, n-butyl, sec-butyl or tert-butyl.

$C_1$-$C_{18}$ alkyloyl (alkylcarbonyl) can be by way of example acetyl, propionyl, n-butyloyl, sec-butyloyl, tert-butyloyl, 2-ethylhexylcarbonyl, decanoyl, dodecanoyl, chloroacetyl, trichloroacetyl or trifluoroacetyl.

$C_1$-$C_{18}$-alkyloxycarbonyl can be by way of example methyloxycarbonyl, ethyloxycarbonyl, propyloxycarbonyl, isopropyloxycarbonyl, n-butyloxycarbonyl, sec-butyloxycarbonyl, tert-butyloxycarbonyl, hexyloxycarbonyl, 2-ethylhexyloxycarbonyl or benzyloxycarbonyl.

$C_5$-$C_{12}$ cycloalkylcarbonyl can be by way of example cyclopentylcarbonyl, cyclohexylcarbonyl or cyclododecylcarbonyl.

$C_6$-$C_{12}$ aryloyl (arylcarbonyl) can be by way of example benzoyl, toluyl, xyloyl, α-naphthoyl, β-naphthoyl, chlorobenzoyl, dichlorobenzoyl, trichlorobenzoyl or trimethylbenzoyl.

$R^1$, $R^2$, $R^3$, $R^4$, $R^5$ and $R^6$ independently of one another are preferably hydrogen, methyl, ethyl, n-butyl, 2-hydroxyethyl, 2-cyanoethyl, 2-(methoxycarbonyl)ethyl, 2-(ethoxycarbonyl)-ethyl, 2-(n-butoxycarbonyl)ethyl, dimethylamino, diethylamino and chlorine.

$R^7$ is preferably methyl, ethyl, n-butyl, 2-hydroxyethyl, 2-cyanoethyl, 2-(methoxycarbonyl)-ethyl, 2-(ethoxycarbonyl)ethyl, 2-(n-butoxycarbonyl)ethyl, acetyl, propionyl, t-butyryl, methoxycarbonyl, ethoxycarbonyl or n-butoxycarbonyl.

Particularly preferred pyridinium ions (Ia) are those in which one of the radicals $R^1$ to $R^5$ is methyl, ethyl or chlorine, $R^7$ is acetyl, methyl, ethyl or n-butyl and all others are hydrogen, or $R^3$ is dimethylamino, $R^7$ acetyl, methyl, ethyl or n-butyl and all others are hydrogen, or $R^7$ is acetyl, methyl, ethyl or n-butyl and all others are hydrogen, or $R^2$ is carboxy or carboxamido, $R^7$ acetyl, methyl, ethyl or n-butyl and all others are hydrogen, or $R^1$ and $R^2$ or $R^2$ and $R^3$ are 1,4-buta-1,3-dienylene, $R^7$ acetyl, methyl, ethyl or n-butyl and all others are hydrogen.

Particularly preferred pyridazinium ions (Ib) are those in which One of the groups $R^1$ to $R^4$ is methyl or ethyl, $R^7$ is acetyl, methyl, ethyl or n-butyl and all others are hydrogen, or $R^7$ is acetyl, methyl, ethyl or n-butyl and all others are hydrogen.

Particularly preferred pyrimidinium ions (Ic) are those in which $R^2$ to $R^4$ are hydrogen or methyl, $R^7$ is acetyl, methyl, ethyl or n-butyl and $R^1$ is hydrogen, methyl or ethyl, or $R^2$ and $R^4$ are methyl, $R^3$ is hydrogen and $R^1$ is hydrogen, methyl or ethyl and $R^7$ is acetyl, methyl, ethyl or n-butyl.

Particularly preferred pyrazinium ions (Id) are those in which $R^1$ to $R^4$ are all methyl and $R^7$ is acetyl, methyl, ethyl or n-butyl, or $R^7$ is acetyl, methyl, ethyl or n-butyl and all others are hydrogen.

Particularly preferred imidazolium ions (Ie) are those in which independently of one another $R^1$ is selected from methyl, ethyl, n-propyl, n-butyl, n-pentyl, n-octyl, n-decyl, n-dodecyl, 2-hydroxyethyl or 2-cyanoethyl, $R^7$ is acetyl, methyl, ethyl or n-butyl and $R^2$ to $R^4$ independently of one another stand for hydrogen, methyl or ethyl.

Particularly preferred 1H-pyrazolium ions (If) are those in which independently of one another $R^1$ is selected from hydrogen, methyl or ethyl, $R^2$, $R^3$ and $R^4$ from hydrogen or methyl and $R^7$ from acetyl, methyl, ethyl or n-butyl.

Particularly preferred 3H-pyrazolium ions (Ig) are those in which independently of one another $R^1$ is selected from hydrogen, methyl or ethyl, $R^2$, $R^3$ and $R^4$ from hydrogen or methyl and $R^7$ from acetyl, methyl, ethyl or n-butyl.

Particularly preferred 4H-pyrazolium ions (Ih) are those in which independently of one another $R^1$ to $R^4$ are selected from hydrogen or methyl and $R^7$ from acetyl, methyl, ethyl or n-butyl.

Particularly preferred 1-pyrazolinium ions (Ii) are those in which independently of one another $R^1$ to $R^6$ are selected from hydrogen or methyl and $R^7$ from acetyl, methyl, ethyl or n-butyl.

Particularly preferred 2-pyrazolinium ions (Ij) are those in which independently of one another
$R^1$ is selected from hydrogen, methyl, ethyl or phenyl,
$R^7$ from acetyl, methyl, ethyl or n-butyl and
$R^2$ to $R^6$ from hydrogen or methyl.

Particularly preferred 3-pyrazolinium ions (Ik) are those in which independently of one another
$R^1$ or $R^2$ is selected from hydrogen, methyl, ethyl or phenyl,
$R^7$ from acetyl, methyl, ethyl or n-butyl and
$R^3$ to $R^6$ from hydrogen or methyl.

Particularly preferred imidazolinium ions (Il) are those in which independently of one another
$R^1$ or $R^2$ is selected from hydrogen, methyl, ethyl, n-butyl or phenyl,
$R^7$ from acetyl, methyl, ethyl or n-butyl and
$R^3$ or $R^4$ from hydrogen, methyl or ethyl and
$R^5$ or $R^6$ from hydrogen or methyl.

Particularly preferred imidazolinium ions (Im) are those in which independently of one another
$R^1$ or $R^2$ is selected from hydrogen, methyl or ethyl,
$R^7$ from acetyl, methyl, ethyl or n-butyl and
$R^3$ to $R^6$ from hydrogen or methyl.

Particularly preferred imidazolinium ions (In) are those in which independently of one another
$R^1$, $R^2$ or $R^3$ is selected from hydrogen, methyl or ethyl,
$R^7$ from acetyl, methyl, ethyl or n-butyl and
$R^4$ to $R^6$ from hydrogen or methyl.

Particularly preferred thiazolium ions (Io) or oxazolium ions (Ip) are those in which independently of one another
$R^1$ is selected from hydrogen, methyl, ethyl or phenyl,
$R^7$ from acetyl, methyl, ethyl or n-butyl and
$R^2$ or $R^3$ from hydrogen or methyl.

Particularly preferred 1,2,4-triazolium ions (Iq) and (Ir) are those in which independently of one another
$R^1$ or $R^2$ is selected from hydrogen, methyl, ethyl or phenyl,
$R^7$ from acetyl, methyl, ethyl or n-butyl and
$R^3$ from hydrogen, methyl or phenyl.

Particularly preferred 1,2,3-triazolium ions (Is) and (It) are those in which independently of one another
$R^1$ is selected from hydrogen, methyl or ethyl,
$R^7$ from acetyl, methyl, ethyl or n-butyl and
$R^2$ or $R^3$ from hydrogen or methyl, or
$R^2$ and $R^3$ are 1,4-buta-1,3-dienylene and all others are hydrogen.

Particularly preferred pyrrolidinium ions (Iu) are those in which independently of one another
$R^1$ and $R^7$ are selected from acetyl, methyl, ethyl or n-butyl and
$R^2$, $R^3$, $R^4$ and $R^5$ stand for hydrogen.

Particularly preferred ammonium ions (Iv) are those in which independently of one another
$R^7$ is selected from acetyl, methyl, ethyl or n-butyl and
$R^1$, $R^2$, and $R^3$ from methyl, ethyl, n-butyl, 2-hydroxyethyl, benzyl or phenyl.

Particularly preferred phosphonium ions (Iw) are those in which independently of one another
$R^7$ is selected from acetyl, methyl, ethyl or n-butyl and
$R^1$, $R^2$, and $R^3$ from phenyl, phenoxy, ethoxy and n-butoxy.

Among these the ammonium, phosphonium, pyridinium and imidazolium ions are preferred.

Very particularly preferred as cations are 1,2-dimethylpyridinium, 1-methyl-2-ethylpyridinium, 1-methyl-2-ethyl-6-methylpyridinium, N-methylpyridinium, 1-butyl-2-methylpyridinium, 1-butyl-2-ethylpyridinium, 1-butyl-2-ethyl-6-methylpyridinium, N-butylpyridinium, 1-butyl-4-methylpyridinium, 1,3-dimethylimidazolium, 1,2,3-trimethylimidazolium, 1-n-butyl-3-methylimidazolium, 1,3,4,5-tetramethylimidazolium, 1,3,4-trimethylimidazolium, 2,3-dimethylimidazolium, 1-butyl-2,3-dimethylimidazolium, 3,4-dimethylimidazolium, 2-ethyl-3,4-dimethylimidazolium, 3-methyl-2-ethylimidazolium, 3-butyl-1-methylimidazolium, 3-butyl-1-ethylimidazolium, 3-butyl-1,2-dimethylimidazolium, 1,3-di-n-Butylimidazolium, 3-butyl-1,4,5-trimethylimidazolium, 3-butyl-1,4-dimethylimidazolium, 3-butyl-2-methylimidazolium, 1,3-dibutyl-2-methylimidazolium, 3-butyl-4-methylimidazolium, 3-butyl-2-ethyl-4-methylimidazolium and 3-butyl-2-ethylimidazolium, 1-methyl-3-octylimidazolium and 1-decyl-3-methylimidazolium.

Particularly preferred are 1-butyl-4-methylpyridinium, 1-n-butyl-3-methylimidazolium and 1-n-butyl-3-ethylimidazolium, For the anions, all anions are conceivable in principle.

Preferred anions are halides, F—, Cl—, Br—, I—, acetate $CH_3COO$—, trifluoroacetate $CF_3COO$—, triflate $CF_3SO_3$—, sulfate $SO_4^{2-}$, hydrogensulfate $HSO_4$—, methylsulfate $CH_3OSO_3$—, ethylsulfate $C_2H_5OSO_3$—, sulfite $SO_3^{2-}$, hydrogensulfite $HSO_3$—, chloroaluminates $AlCl_4$—, $Al_2Cl_7$—, $Al_3Cl_{10}$—, tetrabromoaluminate $AlBr_4$—, nitrite $NO_2$—, nitrate $NO_3$—, chlorocuprate $CuCl_2$—, phosphate $PO_4^{3-}$, hydrogenphosphate $HPO_4^{2-}$, dihydrogenphosphate $H_2PO_4$—, carbonate $CO_3^{2}$ and hydrogencarbonate $HCO_3$—.

Particularly preferred tetrafluoroborate $BF_4$—, hexafluorophosphate $PF_6$—, bis(trifluoromethylsulfonyl)imide $(CF_3SO_2)_2N$— and tosylate $p$-$CH_3C_6H_4SO_3$—.

Ionic liquids which are very particularly preferred are those whose salts exhibit an $E_T(30)$ value of >20, preferably of >30, particularly preferably of >40. The $E_T(30)$ value is a measure of polarity and is described by C. Reichardt in Reichardt, Christian, Solvent Effects in Organic Chemistry, Weinheim: VCH, 1979-XI, (Monographs in Modern Chemistry 3), ISBN 3-527-25793-4, page 241.

The change in separation factor brought about by the entrainer can be determined by a number of methods, preferably by headspace analysis as published by Hachenberg and Schmidt in Verfahrenstechnik, 8(1974), 12, pages 343-347. In determining the effect of the entrainer on the mixture to be separated (the feed) calculation is generally done on an entrainer-free basis, that is to say that although the concentration of the entrainer in the liquid mixture is noted it is not taken into account in the percentage statement of the concentrations of the target components.

Suitable ionic liquids are those which at a total concentration in the liquid of 5 to 90 mol %, preferably 10 to 70 mol %, result in a change in the separation factor of the target components relative to one another different from one. This change can be determined in the described headspace analysis.

The ionic liquid acting as entrainer is selected so that
it has as high a selectivity as possible,
it dissolves homogeneously to a concentration of at least 5 mol % in the mixture of substances to be separated,
it does not undergo any chemical reaction involving rupture of covalent bonds with either of the components of the mixture of substances to be separated,
the components of the bottom product can be separated from the entrainer at low cost by evaporation due to the supply of heat and/or reduction of pressure or rectification or extraction or stripping using inert gas or conversion into a solid phase.

In the rectification column it is not possible to adjust a constant concentration of the ionic fluid over the entire height of the column. On the contrary, in the enriching section directly below the point of addition of the ionic fluid a higher concentration will set in by comparison with the stripping section below the feed inlet. The quantified value of 5-90 mol % should be measured directly on the feed plate for the ionic fluid. In this way a suitable concentration would be ensured in the enriching section, that. is to say just where the azeotrope is to be broken down.

In order to ensure that the ionic liquid dissolves well in the mixture to be separated the forces of attraction between the molecules of the ionic liquid should be approximately just as great as those between the molecules of the feed. In this case the intermolecular forces in operation are ionic forces, dipole-dipole forces, induction forces, dispersion forces and hydrogen bonds, cf. Ullmann's Encyclopedia of Industrial Chemistry (1993), Vol. A24, pp. 438-439. It is possible to adjust these forces in the ionic liquids by varying the cations. In this way solubility properties can be regulated. Thus, for example, by lengthening the chain of the alkyl residue on an alkylmethylimidazolium tetrafluoroborate the water-repelling properties increase and hence miscibility with water decreases. This adjustment of salvation strength is particularly effective in relation to aliphatics, cf. H. Waffenschmidt, Dissertation, RWTH Aachen, 2000. The anion also has an effect on dissolving characteristics. Criteria for estimating the dissolving behavior of an ionic liquid are the dielectric constant of the ionic liquid and of the feed and the polarity of the mixture.

Figure 1:
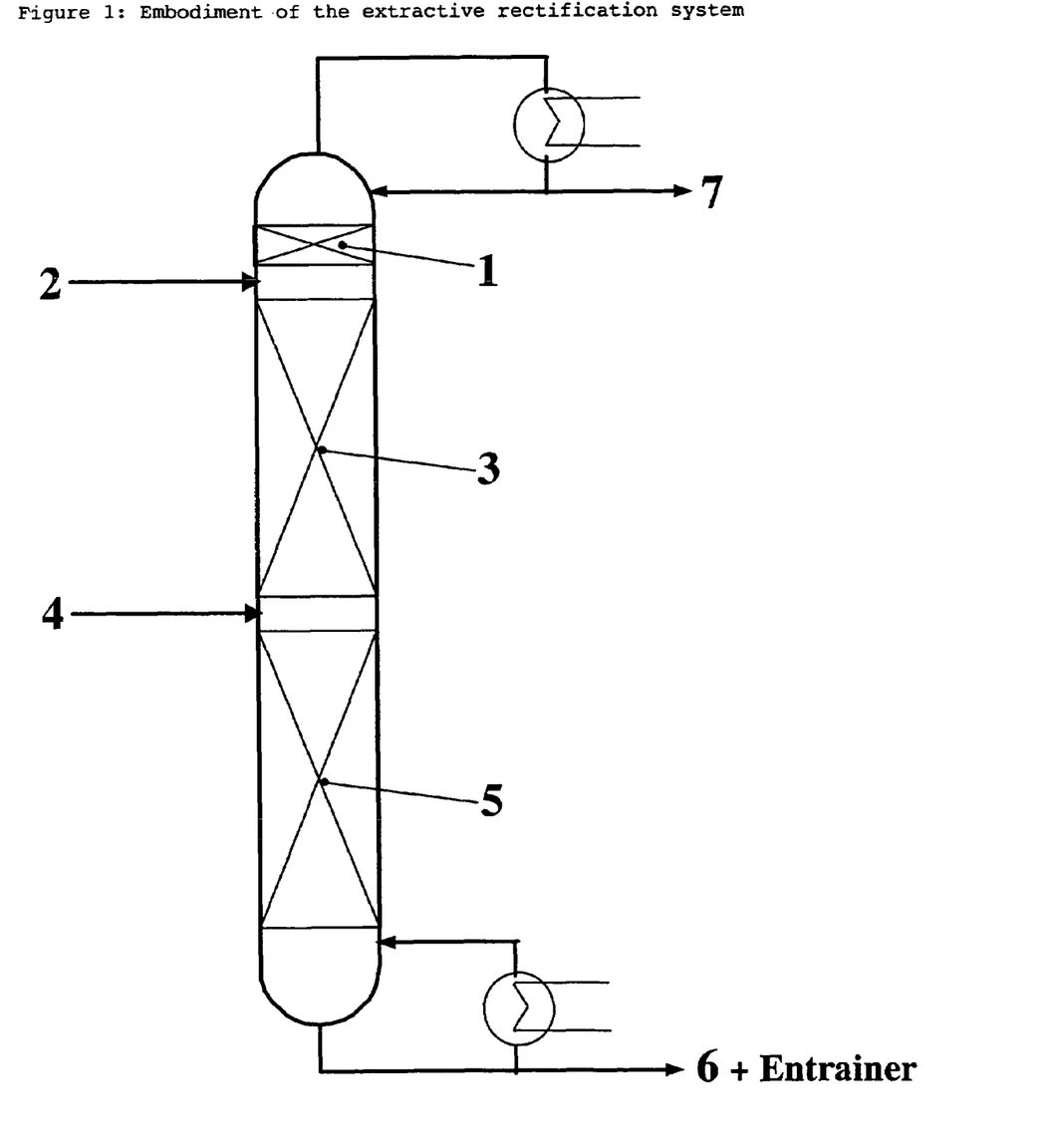
FIG. 1: Embodiment of the extractive rectification system.

An embodiment of extractive rectification in a process is illustrated by FIG. 1. "2" is the inflow of the entrainer into a countercurrent rectification column. Since in conventional processes the entrainer has a slight but appreciable volatility relative to the top product (stream 7) separative elements "1" must be used for separation between the top product and entrainer. The separative elements "3" and "5" bring about the desired separation between overhead product and bottom product under the action of the entrainer, stream "4" is the inflow of the components to be separated (feed) and stream "6" is bottom product and the entrainer. Separative elements can be by way of example plates or ordered or disordered packings.

The process according to the invention has the advantage that—as mentioned above—the vapor pressure of the pure ionic liquid and hence also its partial pressure in the mixture with the top product is approximately equal to zero. Accordingly, in the process according to the invention the separative elements "1" may be dispensed with.

The ionic fluid is added preferably in the enriching section close to the top of the column, particularly preferably in the uppermost 3 stages, very particularly preferably in the uppermost stage below the condenser.

A further advantage of the process according to the invention with ionic liquid as entrainer is that in order to separate the entrainer from the bottom product various separating operations may be used. Advantageous embodiments are:

Regeneration of the entrainer by simple evaporation.
Since the vapor pressure of the pure entrainer and hence also its partial pressure in the mixture with the bottom product is approximately equal to zero, an evaporation process can be run continuously or discontinuously without further separative elements. Thin film evaporators such as falling-film or rotary evaporators are particularly suitable for continuous evaporation. In discontinuous concentration processes two evaporator stages are run alternately so that regenerated ionic liquid can be fed continuously to the extractive rectification column.

Regeneration of the entrainer by means of a stripping column Since the vapor pressure of the pure entrainer and hence also its partial pressure in the mixture with the bottom product is equal to zero the entrainer cannot be completely freed of bottom product in the countercurrent process by evaporation alone. In an advantageous embodiment hot gas is conveyed in a stripping column in countercurrent flow relative to a mixture of bottom product and entrainer.

Many ionic liquids are notable for crystallization or glass transition temperatures which are well below 0° C. In these cases particularly simple, low-cost separation and recirculation of the ionic liquid is possible by precipitation to form a solid phase. The bottom product is then obtained in solid form while the entrainer can be returned as the pure substance to the extractive rectification process. Precipitation can be carried out in accordance with the teachings of cooling crystallization, evaporative crystallization or vacuum crystallization. If the freezing point of the entrainer is above the freezing point of the bottom product in a variant of this method the entrainer is obtained as the solid phase and the bottom product as the liquid phase.

The use of ionic fluids as entrainers in extractive rectification is particularly suitable inter alia for the following applications, e.g. azeotropes: amines/water, THF/water, formic acid/water, alcohols/water, acetone/methanol, acetate/water, acrylate/water or close-boiling mixtures: acetic acid/water, C4 hydrocarbons, C3 hydrocarbons, alkanes/alkenes.

For the following reasons the process according to the invention is a substantial improvement over the processes in the literature for conventional extractive rectification.

Ionic liquids are more selective than traditional entrainers. Due to their high selectivity by comparison with conventional extractive rectification they allow a lower mass flow rate of entrainer to be fed in extractive rectification and/or the number of separation stages in the extractive rectification column to be reduced.

Due to the extremely low vapor pressure of the entrainer various separation operations can be used to separate the entrainer from the bottom product which by comparison with the second rectification column in conventional extractive rectification afford an advantage in terms of running and capital costs.

The separative elements "1" in conventional extractive rectification result in separation of the entrainer from the overhead product, but separation is never complete. Discharge of portions of ionic liquid via the vapor phase without the separative elements "1" is not possible due to its extremely low volatility.

Capital costs are reduced because the separative elements "1" are not needed.

The process according to the invention is explained below by means of examples.

EXAMPLE 1

System to be Separated: Butene-butane

According to the literature [Gmehling, J, Onken, U and Arlt, W, Vapor-Liquid Equilibrium Data Collection, Dechema Data Series, Vol. I Part 6a, p. 17] the butene-butane system is a close-boiling system. The separation factor which was measured by means of gas-liquid chromatography (GLC) at infinite dilution of butane and butene in the ionic liquid octylmethylimidazolium tetrafluoroborate (OMIM-$BF_4$) at 70° C. is 0.74.

The calculation of the separation factor as a function of the activity coefficient was published by Gmehling and Brehm

[Gmehling, J. and Brehm, A., Grundoperationen (Unit Operations), ISBN 3-13-687401-3, chapter 3].

Accordingly, the additive interacts more vigorously with butene than with butane. The powerful effect exhibited by the ionic liquid OMIM-$BF_4$ on the phase equilibrium of the binary butene-butane system demonstrates the suitability of OMIM-$BF_4$ as an entrainer for separating alkanes and alkenes.

EXAMPLE 2

System to be Separated:
Cyclohexanol-cyclohexanone

According to the literature [Gmehling, J, Onken, U and Arlt, W, Vapor-Liquid Equilibrium Data Collection, Dechema Data Series, Vol. I Part 2b, p. 403] the cyclohexanol-cyclohexanone system is a close-boiling system.

The separation factor which was measured by means of gas-liquid chromatography at infinite dilution of cyclohexanol and cyclohexanone in the ionic liquids ethylmethylimidazolium tetrafluoroborate (EMIM-$BF_4$) and ethylmethylimidazolium hexafluorophosphate (EMIM-$PF_6$) is 1.66 at 142° C. for EMIM-$BF_4$ and 1.61 at 140.8° C. for EMIM-$PF_6$. Both ionic liquids bring about an increase in the separation factor of the cyclohexanol-cyclohexanone separation system and are thus suitable as entrainers.

EXAMPLE 3

System to be Separated: Acetone-methanol

According to the literature [Gmehling, J, Onken, U and Arlt, W, Vapor-Liquid Equilibrium Data Collection, Dechema Data Series, Vol. I Part 2a, p. 75] the acetone-methanol system forms an azeotrope. The separation factor for a mixture of a ketone and an alcohol, acetone and methanol in this case, was determined by means of GLC in infinite dilution in the ionic liquids EMIM-$BF_4$, OMIM-$BF_4$, MMIM-$CH_3SO_4$, EMIM-$(CF_3SO_2)_2N$ and EMIM-$PF_6$. These experiments yielded a separation factor of 2.51 at 70° C. for EMIM-$BF_4$, of 3.15 at 70° C. for OMIM-$BF_4$, of 1.3 at 70.5° C. for MMIM-$CH_3SO_4$, of 0.5 at 84.6° C. for EMIM-$(CF_3SO_2)_2N$ and of 0.67 at 70° C. for EMIM-$PF_6$. From these results it may be seen that it is not just isolated ionic liquids that are suitable as entrainers. On the contrary, many members of this novel class of substances, the ionic liquids, are suitable for use as entrainers.

The process according to the invention is explained below by means of further examples in which headspace analysis is used.

EXAMPLE 4

Effect of the Ionic Liquid
1-ethyl-3-methylimidazolium Tetrafluoroborate on
the Binary Homoazeotropic System Ethanol-water Table 1 shows the effect of the additive (entrainer) 1-ethyl-3-methylimidazolium tetrafluoroborate on the binary ethanol-water system at θ=70° C. and a molar liquid concentration of the entrainer of 10 mol % and 50 mol %.

TABLE 1

Separation factor α of the binary, homoazeotropic system ethanol-water at 70° C. using different quantities of the ionic liquid 1-ethyl-3-methylimidazolium tetrafluoroborate

| $^x$Ethanol [mol %] | $^x$Water [mol %] | $^\alpha$Ethanol, Water binary system without entrainer according to the invention | $^\alpha$Ethanol, Water ternary system containing 10 mol % of entrainer according to the invention | $^\alpha$Ethanol, Water ternary system containing 50 mol % of entrainer according to the invention | $^\alpha$Ethanol, Water ternary system containing 70 mol % of entrainer according to the invention |
|---|---|---|---|---|---|
| 0.10 | 0.90 | 7.12 | 4.64 | 5.74 | 6.23 |
| 0.20 | 0.80 | 4.45 | 3.90 | 5.49 | 6.11 |
| 0.30 | 0.70 | 2.99 | 3.25 | 5.17 | 6.00 |
| 0.40 | 0.60 | 2.37 | 2.70 | 4.77 | 5.86 |
| 0.50 | 0.50 | 1.88 | 2.41 | 4.57 | 5.72 |
| 0.60 | 0.40 | 1.58 | 2.12 | 4.38 | 5.58 |
| 0.70 | 0.30 | 1.34 | 1.85 | 4.20 | 5.25 |
| 0.80 | 0.20 | 1.17 | 1.68 | 4.02 | 4.95 |
| 0.90 | 0.10 | 1.06 | 1.48 | 3.99 | 4.90 |
| 0.95 | 0.05 | 1.00 | 1.32 | 3.56 | 4.87 |

The ethanol-water azeotrope occurs at approximately $x_{Ethanol}$=0.95. It is precisely in the range around this that the entrainer has an effect, even at a concentration of 10 mol % in the liquid phase. The fact that in this and in the following examples a higher separation factor is achieved in the peripheral region without entrainer than with entrainer is not disadvantageous since:

a) preliminary concentration can be carried out without entrainer;
b) separation factors about>5 approximately have virtually no influence on operating and capital costs.

EXAMPLE 5

Effect of the Ionic Liquid
1-ethyl-3-methylimidazolium Tetrafluoroborate on
the Binary Homoazeotropic System
Tetrahydrofuran-water Table 2 shows the effect of the entrainer 1-ethyl-3-methylimidazolium tetrafluoroborate on the binary tetrahydrofuran (THF)-water system at 70° C. and a molar liquid concentration of the entrainer of 50 mol %.

TABLE 2

Separation factor α of the homoazeotropic system tetrahydrofuran (THF)-water at 70° C. with and without the ionic liquid 1-ethyl-3-methylimidazolium tetrafluoroborate

| $x_{THF}$ [mol %] | $x_{Water}$ [mol %] | $^{\alpha}$THF, Water binary system without entrainer according to the invention | $^{\alpha}$THF, Water ternary system containing 50 mol % of entrainer according to the invention |
|---|---|---|---|
| 0.10 | 0.90 | 25.54 | 18.09 |
| 0.20 | 0.80 | 12.38 | 16.73 |
| 0.30 | 0.70 | 7.97 | 15.37 |
| 0.40 | 0.60 | 5.59 | 14.01 |
| 0.50 | 0.50 | 3.87 | 12.65 |
| 0.60 | 0.40 | 2.56 | 11.29 |
| 0.70 | 0.30 | 1.64 | 9.93 |
| 0.80 | 0.20 | 1.10 | 8.57 |
| 0.90 | 0.10 | 0.79 | 7.21 |

The azeotrope at values of $x_{THF}$ between 0.8 and 0.9 is impressively removed.

EXAMPLE 5a

Effect of the Ionic Liquid 1-ethyl-3-methylimidazolium Tetrafluorotosylate on the Binary Homoazeotropic System Tetrahydrofuran-water Table 2a shows the effect of the entrainer 1-ethyl-3-methylimidazolium tetrafluorotosylate on the binary tetrahydrofuran (THF)-water system at a pressure of 1 bar and a molar liquid concentration of the entrainer of 50 mol %.

TABLE 2a

Separation factor α of the tetrahydrofuran (THF)-water system at 1 bar with the ionic liquid 1-ethyl-3-methylimidazolium tetrafluorotosylate. The measured results shown here were not obtained by headspace chromatography but rather by means of an equilibrium apparatus. Here also a distinct increase in the separation factor relative to the binary system (see Table 2) and hence the suitability of the ionic fluid as entrainer may be seen.

| $x_{THF}$ [mol %] | $x_{Water}$ [mol %] | $^{\alpha}$THF, Water ternary system containing 50% of entrainer according to the invention |
|---|---|---|
| 0.2459 | 0.7541 | 23.3 |
| 0.3843 | 0.6157 | 24.7 |
| 0.5355 | 0.4645 | 23.8 |
| 0.6307 | 0.3693 | 22.8 |

EXAMPLE 6

Effect of the Ionic Liquid 1-ethyl-3-methylimidazolium Tetrafluoroborate on the Binary Homoazeotropic System Propanol-water Table 3 shows the effect of the entrainer 1-ethyl-3-methylimidazolium tetrafluoroborate on the binary propanol-water system at 85° C. and a molar liquid concentration of the entrainer of 50 mol %.

TABLE 3

Separation factor α of the homoazeotropic system propanol-water at 85° C. with and without the ionic liquid 1-ethyl-3-methylimidazolium tetrafluoroborate

| $x_{Propanol}$ [Mol %] | $x_{Water}$ [Mol %] | $^{\alpha}$Propanol, Water binary system without entrainer according to the invention | $^{\alpha}$Propanol, Water ternary system containing 50 mol % of entrainer according to the invention |
|---|---|---|---|
| 0.4 | 0.6 | 1.10 | 3.12 |
| 0.6 | 0.4 | 0.68 | 2.46 |

EXAMPLE 7

Effect of the Ionic Liquid 1-ethyl-3-methylimidazolium Tetrafluoroborate on the Binary Homoazeotropic System Isopropanol-water Table 4 shows the effect of the entrainer 1-ethyl-3-methylimidazolium tetrafluoroborate on the binary isopropanol-water system at 90° C. and a molar liquid concentration of the entrainer of 50 mol %.

TABLE 4

Separation factor α of the homoazeotropic system isopropanol-water at 90° C. with and without the ionic liquid 1-ethyl-3-methylimidazolium tetrafluoroborate

| $x_{Isopropanol}$ [Mol %] | $x_{Water}$ [Mol %] | $^{\alpha}$Isopropanol, Water binary system without entrainer according to the invention | $^{\alpha}$Isopropanol, Water ternary system containing 50 mol % of entrainer according to the invention |
|---|---|---|---|
| 0.4 | 0.6 | 2.09 | 5.73 |
| 0.6 | 0.4 | 1.29 | 4.64 |

In Tables 1 to 4 a marked difference is discernible between the binary phase compositions and the ternary phase equilibrium compositions formed after addition of the nonvolatile entrainer according to the invention 1-ethyl-3-methylimidazolium tetrafluoroborate. Due to selective interactions with the polar system component, water, the ionic liquid exercises an advantageous effect on the separation factor. Moreover, in the ethanol-water (Table 1) and tetrahydrofuran-water (Table 2) systems it is clearly evident that the effect of the ionic liquid on the vapor-liquid phase equilibrium is so great that the azeotropic point has been broken down, that is to say it no longer occurs.

EXAMPLE 8

Advantage of the Entrainer According to the Invention Relative to Conventional Entrainers with Reference to the Example of the Separation of Ethanol and Water Table 5 shows for the ethanol-water system the effect of the two entrainers 1-ethyl-3-methylimidazolium tetrafluoroborate and ethanediol on the vapor-liquid phase equilibrium at 70° C. for the entrainer concentration of 50 mol %.

TABLE 5

Comparison of the separation factors α in the ethanol-water system at 70° C. for the conventional entrainer ethanediol and the entrainer according to the invention 1-ethyl-3-methylimidazolium tetrafluoroborate

| $x_{Ethanol}$ [mol %] | $x_{Water}$ [mol %] | $\alpha$Ethanol, Water binary system without entrainer according to the invention | $\alpha$Ethanol, Water ternary system containing 50 mol % of ethanediol | $\alpha$Ethanol, Water ternary system containing 50 mol % of entrainer according to the invention |
|---|---|---|---|---|
| 0.10 | 0.90 | 7.12 | 4.96 | 5.74 |
| 0.20 | 0.80 | 4.45 | 4.37 | 5.49 |
| 0.30 | 0.70 | 2.99 | 3.77 | 5.17 |
| 0.40 | 0.60 | 2.37 | 3.45 | 4.77 |
| 0.50 | 0.50 | 1.88 | 3.14 | 4.57 |
| 0.60 | 0.40 | 1.58 | 2.82 | 4.38 |
| 0.70 | 0.30 | 1.34 | 2.63 | 4.20 |
| 0.80 | 0.20 | 1.17 | 2.44 | 4.02 |
| 0.90 | 0.10 | 1.06 | 1.83 | 3.99 |
| 0.95 | 0.05 | 1.00 | 1.32 | 3.56 |

From Table 5 it emerges that for the same concentration of entrainer the effect on the vapor-liquid phase equilibrium and hence the useful effect is distinctly greater in the case of the ionic liquid, particularly in the azeotropic range.

What is claimed is:

1. A process for separating a mixture comprising liquids or condensable gases in the condensed state comprising:
   introducing an entrainer into the mixture,
   wherein the entrainer is an ionic liquid and brings about a change in the separation factor of the components to be separated divergent from one;
   wherein the ionic liquid is present at a total concentration of 5 to 90 mol % in the liquid phase, and
   wherein the separation is carried out by extractive rectification.

2. The process as claimed in claim 1, wherein the mixture is a water-containing system which in addition to water contains alcohols having a carbon number between 1 and 12, organic acids, ketones, and furans and wherein the process results in the separation of the water from the other substances.

3. The process as claimed in claim 2, wherein the organic acids are alkanoic acids.

4. The process as claimed in claim 1, wherein said mixture contains alkanes and alkenes having a carbon number between 3 and 12, and wherein the process results in the separation between alkanes and alkenes.

5. The process as claimed in claim 1, wherein said mixture contains aromatic and aliphatic hydrocarbons and wherein the process results in the separation between aromatics and aliphatics.

6. The process as claimed in claim 1, wherein said mixture contains ketones and alicyclic compounds and the ketones are separated from the alicyclic components.

7. The process as claimed in claim 1, wherein said mixture contains amides and acids, and the amides are separated from the acids.

8. The process as claimed in claim 7, wherein the acids are carboxylic acids.

9. The process as claimed in claim 1, wherein said mixture contains alcohols and alkanes and the alkanes are separated from the alcohols.

10. The process as claimed in claim 1, wherein said mixture contains alcohols and aromatics and the alcohols are separated from the aromatics.

11. The process as claimed in claim 1, wherein said mixture contains ketones and alcohols and the ketones are separated from the alcohols.

12. The process as claimed in claim 1, wherein said mixture contains acetates and ketones and the acetates are separated from the ketones.

13. The process as claimed in claim 1, wherein said mixture contains ethers and alkanes and the ethers are separated from the alkanes.

14. The process as claimed in claim 1, wherein said mixture contains ethers and alkenes and the ethers are separated from the alkenes.

15. The process as claimed in claim 1, wherein said mixture contains sulfides and ketones and the sulfides are separated from the ketones.

16. The process as claimed in claim 1, wherein said mixture contains halogenated hydrocarbons and ketones and the halogenated hydrocarbons are separated from the ketones.

17. The process as claimed in claim 1, wherein said mixture contains cyclic ketones and/or cyclic alcohols and these are separated from one another.

18. The process as claimed in claim 1, wherein the anion of said ionic liquid used as said entrainer is a metallic halide.

19. The process as claimed in claim 1, wherein said ionic liquid has an anion selected from the group consisting of nitrate, tetrachloroaluminate, tetrafluoroborate, heptachlorodialuminate, hexafluorophosphate, methylsulfate, and halide.

20. The process as claimed in claim 1, wherein said ionic liquid used as said entrainer has a cation selected from the group consisting of the imidazolium cation, the pyridinium cation, the ammonium cation, and the phosphonium cation.

21. The process as claimed in claim 1, wherein mixtures of ionic liquids are used as entrainer.

22. The process as claimed in claim 1, wherein the ionic liquid is present at a total concentration of 10 to 70 mol % in the liquid phase.

23. A process for separating components of a feed of liquids or condensable gases in the condensed state, wherein the separation is carried out by extractive rectification in a column, said method comprising:
   introducing the feed to the column,
   introducing an entrainer to the column above the feed,
   obtaining the low-boiling component or components of the feed stream at the top of the column,
   obtaining a liquid mixture comprising all other components of the feed stream, as bottom product, together with said entrainer at the bottom of the column, and
   working up the liquid mixture, comprising the bottom product and entrainer, at the bottom of the column in such a way that said entrainer is recovered and the components of the bottom product are obtained as a further fraction,
   wherein the column is operated in countercurrent flow,
   wherein the entrainer is an ionic liquid and brings about a change in the separation factor of the components to be separated divergent from one,
   and wherein the ionic liquid is present at a total concentration of 5 to 90 mol % in the liquid phase.

24. The process as claimed in claim 23, wherein the work-up of said bottom product from said entrainer is carried out by evaporation in at least one evaporator or in at least one rectification column.

25. The process as claimed in claim 23, wherein the workup of the liquid mixture of bottom product and entrainer ensues by precipitation of a component of the liquid mixture having a higher freezing point than the other components of the mixture.

26. The process as claimed in claim 23, wherein the workup of said bottom product from said entrainer is effected by drying.

27. The process as claimed in claim 23, wherein the workup of said bottom product from said entrainer is effected by extraction.

28. The process as claimed in claim 23, wherein no separative elements are needed above the point at which said entrainer is introduced into the extractive rectification system.

29. The process as claimed in claim 23, wherein the separation of said bottom product from said entrainer is effected by stripping using an inert gas.

30. The process as claimed in claim 23, wherein the ionic liquid is present at a total concentration of 10 to 70 mol % in the liquid phase.

* * * * *